(12) United States Patent
Kim et al.

(10) Patent No.: US 9,378,266 B2
(45) Date of Patent: Jun. 28, 2016

(54) SYSTEM AND METHOD FOR SUPPORTING CLUSTER ANALYSIS AND APPARATUS SUPPORTING THE SAME

(71) Applicant: SK PLANET CO., LTD., Seongnam-si, Gyeonggi-do (KR)

(72) Inventors: Minsoeng Kim, Seoul (KR); Doyung Yoon, Seoul (KR); Chaehyun Lee, Seoul (KR); Junesup Lee, Yongin-si (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 160 days.

(21) Appl. No.: 14/347,778

(22) PCT Filed: Jul. 11, 2013

(86) PCT No.: PCT/KR2013/006190
§ 371 (c)(1),
(2) Date: Mar. 27, 2014

(87) PCT Pub. No.: WO2014/038781
PCT Pub. Date: Mar. 13, 2014

(65) Prior Publication Data
US 2014/0236950 A1    Aug. 21, 2014

(30) Foreign Application Priority Data
Sep. 4, 2012    (KR) .................... 10-2012-0097498

(51) Int. Cl.
*G06F 17/30* (2006.01)
*G06K 9/00* (2006.01)
*G06K 9/62* (2006.01)

(52) U.S. Cl.
CPC ...... *G06F 17/30598* (2013.01); *G06K 9/00979* (2013.01); *G06K 9/6223* (2013.01)

(58) Field of Classification Search
CPC combination set(s) only.
See application file for complete search history.

(56) References Cited

U.S. PATENT DOCUMENTS

| | | | |
|---|---|---|---|
| 6,115,708 A * | 9/2000 | Fayyad | G06F 17/30705 |
| 2005/0049826 A1* | 3/2005 | Zhang | G06K 9/6218 |
| | | | 702/179 |
| 2005/0222972 A1* | 10/2005 | Mishra | G06F 17/3071 |
| 2008/0313135 A1* | 12/2008 | Alexe | G06F 17/30598 |

FOREIGN PATENT DOCUMENTS

| | | |
|---|---|---|
| KR | 1020090028953 A | 3/2009 |
| KR | 1020120054985 A | 5/2012 |

OTHER PUBLICATIONS

Siddheswar R. & Rose H.T., "Determination of No. of Clusters in K-Means Clustering and Application in Colour Image Segmentation", pp. 137-143, 1999.

(Continued)

*Primary Examiner* — Etienne Leroux
(74) *Attorney, Agent, or Firm* — Hauptman Ham, LLP

(57) ABSTRACT

Disclosed is a cluster analysis supporting system, with respect to providing a cluster analysis function, including a cluster analysis service apparatus configured to request a distributed processing service apparatus to perform a k-means clustering based on k values within a predetermined range and a preset iteration frequency until a predefined converge condition is satisfied, and if center values of the k values are calculated from the distributed processing service apparatus, select an optimum center value among the center values, and control calculation and application of an optimum k value through an index calculation with respect to applying clustered indexes assigned based on the selected optimum center value to data, and the distributed processing service apparatus configured to perform the k-means clustering based on the k values and the preset iteration frequency provided from the cluster analysis service apparatus upon the request by the cluster analysis service apparatus.

12 Claims, 5 Drawing Sheets

(56) References Cited

OTHER PUBLICATIONS

Miyoung S., Eun M.K., & Seon H.P., "Automatically Finding Good Clusters with Seed K-Means", pp. 326-327, 2003.

Markus M. & Michael G., "Automatic Cluster Number Selection using a Split and Merge K-Means Approach", Aug. 31, 2009.
International Search Report mailed Oct. 18, 2013 for PCT/KR2013/006190.

* cited by examiner

| Result of execution of two-dimensional input data |
|---|

```
3|4|selected|310.5446153021632
          3000|17.335215,12.002399,10.99198,1.6476852
          252|9.112253,-0.67824936,3.5064828,14.812881
          748|8.920427,0.2394945,2.8139524,15.034133
4|3|selected|11.847766357457289
          1000|19.02186,1.9659603,3.978168,0.96862584
          1000|8.968765,0.008223154,2.98847,14.978377
          954|17.020912,15.0289,13.954832,0.9074227
          1046|16.009405,18.837154,14.995067,2.9720392
5|4|selected|11.04168245593631
          1000|8.968767,0.008223152,2.9884713,14.978378
          1000|19.02186,1.9659607,3.9781685,0.9686255
          384|17.470125,14.620083,13.823077,1.0902998
          624|16.670918,15.296638,14.106458,0.88726085
          992|16.000612,19.034283,15.007315,3.0263195
```

Fig 6

| Example of calculation of cluster analysis index | | | | | |
|---|---|---|---|---|---|
| · Application of the present invention after generating total of 500000/1000000 16-dimensional data classified into four clusters That is, optimum cluster analysis result is desired at k=4 · Execution at K=3~6(3,4, 5, 6), NCS=3 | | | | | |
| # data | Running Time | K | Silhoutte | Dunn's Index | Daives-Buoldin Index |
| 500000 | SH-40 mins 21 secs DI/DBI Based on 10S | 3 | 0.6482 | 1.3194 | 0.2947 |
| | | 4 | 0.8351 | 7.3865 | 0.0676 |
| | | 5 | 0.6543 | 0.4065 | 0.9634 |
| | | 6 | 0.4494 | 0.4050 | 0.8057 |
| 1000000 | SH-40hrs 23mins DI/DBI Based on 10S | 3 | 0.6878 | 2.0006 | 0.1979 |
| | | 4 | 0.8693 | 10.1349 | 0.0493 |
| | | 5 | 0.6608 | 1.0985 | 0.3697 |
| | | 6 | 0.6597 | 1.0664 | 0.3017 |

Fig 7

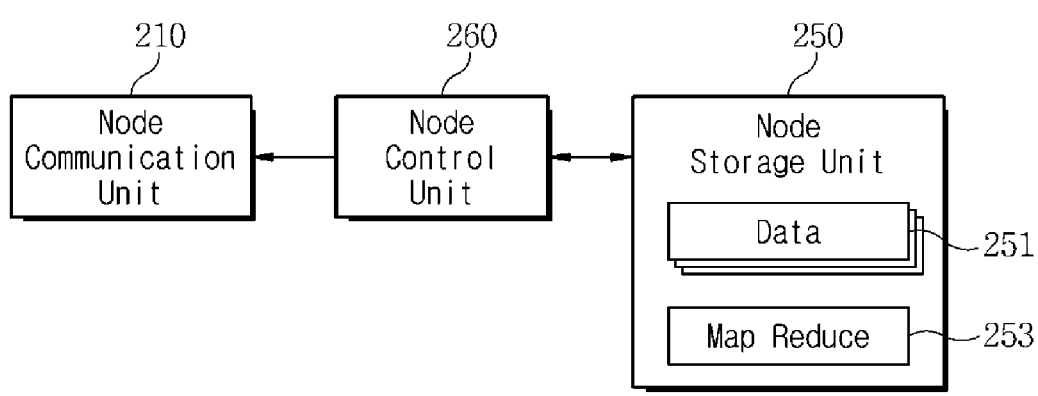

SYSTEM AND METHOD FOR SUPPORTING CLUSTER ANALYSIS AND APPARATUS SUPPORTING THE SAME

CROSS REFERENCE TO RELATED APPLICATION

This application claims the priority of Korean Patent Application No. 10-2012-0097498, filed on Sep. 4, 2012 in the KIPO (Korean Intellectual Property Office). Further, this application is the National Phase application of International Application No. PCT/KR2013/006190 filed Jul. 11, 2013, which designates the United States and was published in Korean.

TECHNICAL FIELD

The present invention relates to cluster analysis, in particular, to a cluster analysis supporting system and method for supporting K-means clustering to process big data in a distributed processing environment, and an apparatus supporting the same.

BACKGROUND ART

A cluster analysis, that is, clustering refers to grouping similar data. Whether or not data is similar varies with the definition of a similarity that is given in advance. When the value of each data is represented as a vector, a geometric distance is mainly used to determine the similarity. One of the most representative examples of the geometric distance used to determine the similarity is an Euclidean distance. Meanwhile, a k-means clustering is a technology for grouping the total of n d-dimensional data into k groups. For example, when two-dimensional input data exists, the k-means clustering represents a task to assign a clustered index ranging from 1 to k to each of the two-dimensional input data.

When such a k-means clustering is used, k is directly determined by a user, and the result of clustering may be significantly changed depending on k. Accordingly, the k value is randomly determined without prior information or knowledge about the k value, and thus it is very difficult to determine the k value, and also a wrongful determination of the k value may cause an undesirable result. Since the k-means clustering is an iterative algorithm, a great n, which means the number of pieces of data, or a high order d of dimension of data may require a great amount of execution time. Even with the same k value, the time taken to converge, that is, the entire running time may be changed or the result may be changed depending on the center value initially determined. As such, the efficiency of the conventional k-means clustering varies with k value input, and thus is it not easy to generalize and requires control of a skilled operator, and even the skilled operator has a high chance to fail to continuously provide a constant result.

DISCLOSURE

Technical Problem

The present invention is directed to providing a cluster analysis supporting system and method capable of providing an appropriate clustering efficiency in a stable manner, and an apparatus supporting the same.

In particular, the present invention is directed to providing a cluster analysis supporting system and method capable of performing an efficient k-means clustering while automatizing the k-means clustering by use of data structure that is suitable for a distributed environment.

Technical Solution

One aspect of the present invention provides a system for supporting a cluster analysis, the system including a cluster analysis service apparatus, and a distributed processing service apparatus. The cluster analysis service apparatus may be configured to request the distributed processing service apparatus to perform a k-means clustering based on k values within a predetermined range and a preset iteration frequency until a predefined converge condition is satisfied, and if center values of the k values are calculated from the distributed processing service apparatus, select an optimum center value among the center values, and control calculation and application of an optimum k value through an index calculation with respect to applying clustered indexes assigned based on the selected optimum center value to data. The distributed processing service apparatus may be configured to perform the k-means clustering based on the k values and the preset iteration frequency provided from the cluster analysis service apparatus upon the request by the cluster analysis service apparatus, and if the center values of the k values are calculated, provide the clustering analysis service apparatus with the center values.

Another aspect of the present invention provides a cluster analysis service apparatus for supporting a cluster analysis, the cluster analysis service apparatus including an apparatus storage unit, an apparatus input unit, and an apparatus control unit. The apparatus storage unit may be configured to store data. The apparatus input unit may be configured to generate an input signal related to at least one of k values within a predetermined range, a convergence condition, and an iteration frequency that are provided for cluster analysis of the stored data. The apparatus control unit may be configured to control such that a k-means clustering is performed and center values of the k values are calculated based on the k values and the iteration frequency until the convergence condition is satisfied, wherein the k-means clustering is performed whenever data is updated.

The apparatus storage unit may store a previous k value calculated according to a previous k-means clustering.

The apparatus control unit may include a data distribution unit, an analysis result selection unit, an analysis index application unit, and an optimum value update unit. The data distribution unit may be configured to distribute data such that the data is subject to a distributed processing. The analysis result selection unit may be configured to, if center values of the k values are calculated, select an optimum center value among the calculated center values. The analysis index application unit may be configured to perform an index calculation with respect to k value efficiency of data assigned clustered indexes obtained by applying a result of selection having the optimum center value to the data. The optimum value update unit may be configured to update a previously stored k value based on a k value having an optimum result of the index calculation.

The apparatus control unit may be configured to automatically perform result calculation of center values with respect to a plurality of k values simultaneously by a plurality of number of times while having a different initialization value each time of the calculation.

Still another aspect of the present invention provides a method of supporting a cluster analysis, the method including: by a cluster analysis service apparatus, performing an initialization on center value vectors based on k values within a predetermined range and an iteration frequency that are input; transmitting data and the initialized center value vectors in a distributed manner to data nodes of a distributed processing service apparatus; by the data nodes, performing a k-means clustering based on the data and the initialized center value vectors that are transmitted in a distributed manner; by the data nodes, providing results of the analysis to the cluster analysis service apparatus; by the cluster analysis service apparatus, selecting an optimum result of the results of the analysis and sharing the selected result with the data nodes; by the data nodes, assigning clustered indexes obtained by applying the selected result to data; by the cluster analysis service apparatus, performing an index calculation on the data to which the clustered indexes are assigned; and updating a previously stored k value using a value having an optimum result of the index calculation.

The method may further include by the cluster analysis service apparatus, transmitting a sampling condition to the data nodes, and by the data nodes, calculating data according to the sampling condition, and providing the calculated data to the cluster analysis service apparatus.

The method may further include by the cluster analysis service apparatus, performing sampling on the data assigned the clustered indexes that are provided by the data nodes.

The performing of the index calculation may include performing calculation of a clustered index for each k value and selecting a k value having a highest clustered index.

The performing of the index calculation may further include applying a plurality of indexing methods to the calculation of the clustered index for each k value to select a relatively higher k value from the plurality of indexing methods.

In the performing of the k-means clustering, a result of the k-means clustering may be automatically calculated with respect to a plurality of k values simultaneously by a plurality of number of times while having a different initialization value each time of the calculation.

Still another aspect of the present invention provides a computer readable recording medium recording a program executing the cluster analysis supporting method.

Advantageous Effects

As apparent from the cluster analysis supporting system and method and an apparatus supporting the same, a k value having an appropriate clustering result is calculated, and an appropriate k value is calculated in a predetermined range of k values regardless of whether or not input is made by a user, thereby supporting stable analysis efficiency.

Accordingly, the present invention provides a clustering data having high reliability.

DESCRIPTION OF DRAWINGS

FIG. 3 is a view illustrating an example of a center value according to the present invention.

FIG. 6 is a view illustrating an example of calculation of a cluster analysis index.

FIG. 7 is a view illustrating an example of a configuration of a data node of a distributed processing service apparatus according to the present invention.

MODES OF THE INVENTION

Figure 1:
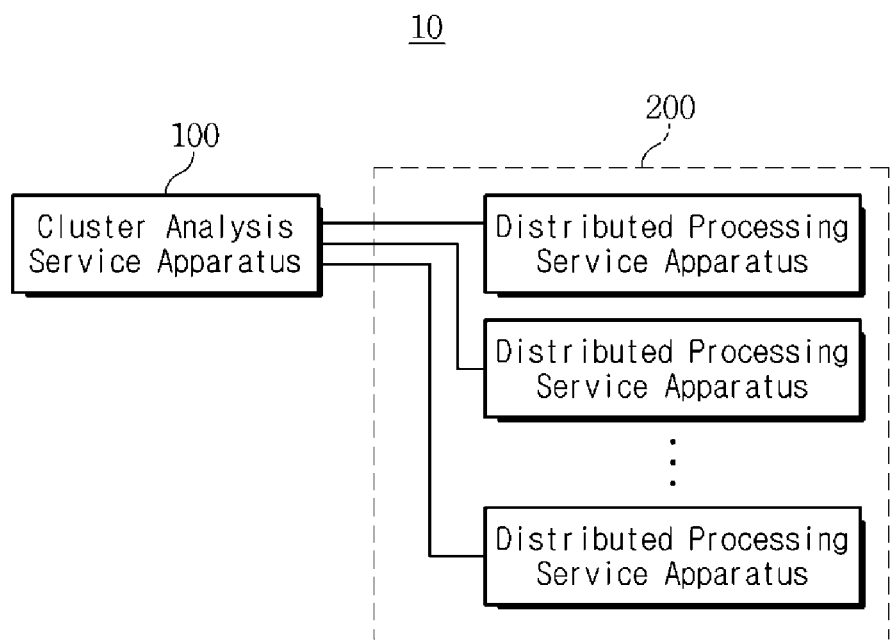
FIG. 1 is a view illustrating a configuration of a cluster analysis supporting system according to an exemplary embodiment of the present invention.

Hereinafter, exemplary embodiments of the present invention will be described in detail. The same reference numerals are used to refer to the same element throughout the specification. In the description of the embodiments, the detailed description of related known functions or constructions will be omitted herein to avoid making the subject matter of the present invention ambiguous.

Meanwhile, exemplary embodiments suggested in the specification and drawings are nothing but the ones provided to bring the present invention to perfection and assist those skilled in the art to completely understand the present invention, and thus the scope of the present invention is not limited to such embodiments and terms. Accordingly, it will be apparent to those skilled in the art that various exemplary embodiments may be made without departing from the scope of the invention.

FIG. 1 is a view illustrating a configuration of a cluster analysis supporting system according to an exemplary embodiment of the present invention.

Referring to FIG. 1, a cluster analysis supporting system 10 includes at least one cluster analysis service apparatus 100 and a distributed processing service apparatus 200 configured to provide the cluster analysis service apparatus 100 with an item search function and a purchase function, and may further include a communication network (not shown) for communication connection between the cluster analysis service apparatus 100 and the distributed processing service apparatus 200.

The cluster analysis supporting system 10 according to the present invention is provided such that the cluster analysis service apparatus 100 transmits collected data and k values within a predetermined range to a MapReduce-based Mapper of each data node of the distributed processing service apparatus 200, and each data node performs a cluster analysis corresponding to the k values within the predetermined range and an iteration number on the transmitted data until a predefined convergence condition is satisfied, so as to provide minimum measurement values.

The cluster analysis supporting system 10 is provided, if minimum measurement values for the respective k values within the predetermined range are provided, to calculate an optimum center value among the minimum measurement values, and apply the optimum center value to the original data, thereby supporting a cluster analysis of each data. In addition, the cluster analysis supporting system 10 is provided such that an index application is provided to test an application efficiency of the cluster analysis, and k value update is performed by use of a k value having the most efficient index value. As described above, the cluster analysis supporting system 10 according to the present invention is provided such that clustering analyses for k values within a predetermined range are simultaneously processed, and the processed results are compared with one another, thereby obtaining an appropriate cluster analysis in a very rapid and precise manner. In particular, the present invention is provided such that, in performing the cluster analysis, a cluster analysis is repeatedly and automatically performed with respect to k values within a predetermined range, thereby supporting k value calculation and application through an automatic cluster analysis according to a data update regardless of whether or not an additional input control is made by a user. Accordingly, the cluster analysis supporting system 10 according to the present invention may support various applications of data based on stable and reliable cluster analysis.

To this end, the communication network (not shown) is provided to form a wired/wireless communication channel between the cluster analysis service apparatus 100 and the distributed processing service apparatus 200. That is, the communication network (not shown) may support signal transmission/reception for data transmission, delivery of the cluster analysis result, and transmission of application result of the cluster analysis index between the cluster analysis service apparatus 100 and the distributed processing service apparatus 200. In particular, the communication network (not shown) transmits information on data and k values within a predetermined range from the cluster analysis service apparatus 100 to the distributed processing service apparatus 200, and transmits the result of cluster analysis from the distributed processing service apparatus 200 to the cluster analysis service apparatus 100. In addition, the communication network (not shown) may transmit a certain k value selected by the cluster analysis service apparatus 100 to the distributed processing service apparatus 200 for being applied, and allow the distributed processing service apparatus 200 to apply a predetermined index to cluster analysis for each data by use of the selected k value.

The cluster analysis service apparatus 100 is connected to the communication network (not shown) by use of an apparatus communication unit, and thus accesses the distributed processing service apparatus 200 connected to the communication network (not shown). The cluster analysis service apparatus 100 may provide the distributed processing service apparatus 200 with data and k values within a predetermined range. The k values within a predetermined range may be a natural number within a predetermined range that is input by a user. The cluster analysis service apparatus 100 may share input k values within a predetermined range with data nodes of the distributed processing service apparatus 200 before data is transmitted. The cluster analysis service apparatus 100 provides the distributed processing service apparatus 200 with collected data.

Meanwhile, the cluster analysis service apparatus 100, upon reception of outputs obtained by applying k values to each data from the distributed processing service apparatus 200, may select center value information having a minimum measurement value among the received outputs. The cluster analysis service apparatus 100 may request the distributed processing service apparatus 200 to apply the selected center value information to the original data. The cluster analysis service apparatus 100, if a clustered index is given as the distributed processing service apparatus 200 applies the selected center value information to the original data, may perform a cluster analysis index calculation to check which k value produces the most effective cluster analysis. The cluster analysis service apparatus 100 may control k value update based on the cluster analysis index calculation. The cluster analysis service apparatus 100 will be described later in detail with reference to FIG. 2.

The distributed processing service apparatus 200 includes a plurality of data nodes while being connected to the cluster analysis service apparatus 100, to perform a cluster analysis based on k values within a predetermined range and data that are provided by the cluster analysis service apparatus 100.

The distributed processing service apparatus 200 may provide the cluster analysis service apparatus 100 with the result of cluster analysis. Thereafter, the distributed processing service apparatus 200 may perform a cluster analysis by applying selected k values provided by the cluster analysis service apparatus 100 to the original data.

The cluster analysis supporting system 10 according to the present invention is provided such that k values within a predetermined range are simultaneously applied to data during the cluster analysis, thereby easily finding k values having an appropriate measurement value, and based on the found k values, performing an effective cluster analysis.

Figure 2:
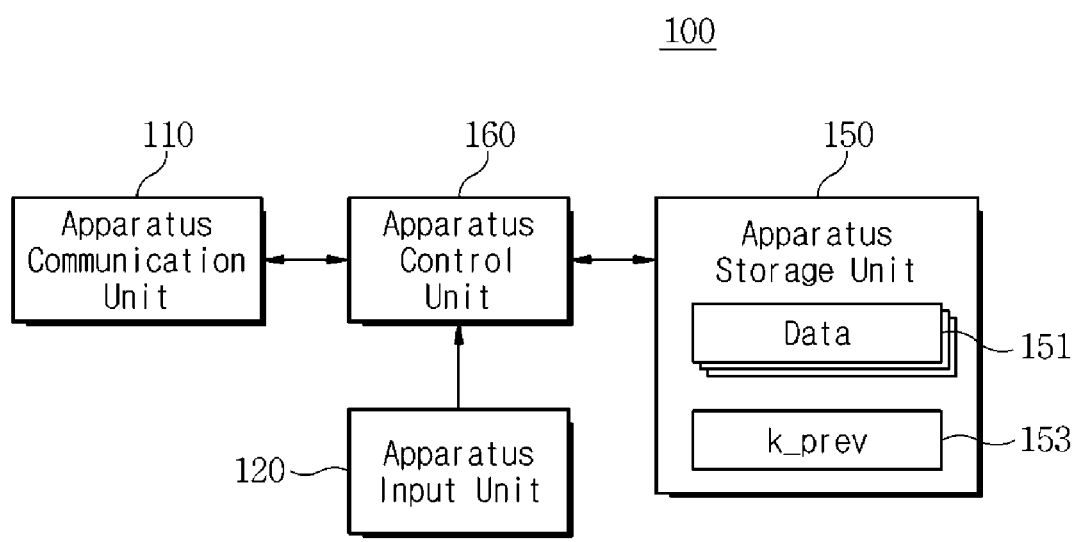
FIG. 2 is a detailed view illustrating a configuration of a cluster analysis service apparatus according to an exemplary embodiment of the present invention.

FIG. 2 is a detailed view illustrating a configuration of the cluster analysis service apparatus 100 according to an exemplary embodiment of the present invention.

Referring to FIG. 2, the cluster analysis service apparatus 100 according to the present invention includes an apparatus communication unit 110, an apparatus input unit 120, an apparatus storage unit 150, and an apparatus control unit 160. For reference, a k-means clustering applied to the cluster analysis according to the present invention belongs to an unsupervised learning method group that is applied when a right answer does not exist and thus a precision and a right answer cannot be compared. When the total of n d-dimensional vectors are provided as inputs, the k-means clustering calculates k centers by which the total of n pieces of data are divided into k clusters. The calculation is iteratively performed and a center to minimize the following Equation 1 is found.

$$\underset{S}{\operatorname{argmin}} \sum_{i=1}^{k} \sum_{x_j \in S_i} \|X_j - \mu_i\|^2 \qquad \text{[Equation 1]}$$

Here, $S_i$ is an index of each cluster and $x_j$ is a $j^{th}$ input. $\mu_i$ is an $i^{th}$ center (i=1, 2, ... and k). The center is updated for each iteration according to the following Equation 2. Each input data is processed as belonging to a nearest center, and a new center is calculated as an average of input data belonging to the new center.

$$m_i^{(t+1)} = \frac{1}{|S_i^{(t)}|} \sum_{x_j \in S_i^{(t)}} x_j \qquad \text{[Equation 2]}$$

In Equation 2, $m_i^{(t+1)}$ represents an $i^{th}$ center value in a $(t+1)^{th}$ step. $|S_i^{(t)}|$ represents the number of pieces of data belonging to a cluster referred to as 'i' in a $(t)^{th}$ iteration. The k-means clustering is continued while iteratively changing the center value until the change of the center value is below a predetermined threshold or the change of measure value is below a predetermined threshold for a predetermined number of times of iterations.

The apparatus storage unit 150 is configured to store various programs and data required to operate the cluster analysis service apparatus 100. In particular, the apparatus storage unit 150 may store entire data 151 to which a k-means clustering is applied as well as a previous k value (k_prev) 153 calculated through a cluster analysis. The data 151 may be partially provided to the distributed processing service apparatus 200 by use of the MapReduce-based Mapper. The data 151 stored in the apparatus storage unit 150 may be provided in a predetermined format to support the cluster analysis. In order to automatize the k-means clustering, a user may specify k values within a predetermined range, and k-means clustering analyses are simultaneously performed with respect to each k value within the whole k range by a predetermined of number of times, and the most optimum k is derived. In more detail, optimum k values are derived with respect to each k within the whole k range, and the most optimum k is derived through an index calculation. For example, k is specified as k=1-5, and clustering analyses with respect to k=1, k=2, . . . and k=5 are simultaneously performed or results of a certain number of times of clustering analyses with respect to a certain k are simultaneously obtained, and then an optimum result is obtained.

To this end, an index of a center value of a certain cluster according to the present invention is defined as a combination of three values. A first column is a k-set ID which identifies a k value corresponding to a center value. A second column is an NCS (the number of candidate set) ID by which k-means clustering analyses are simultaneously performed with respect to a certain k value. A smallest (optimum) measure value from results of the analyses simultaneously performed with respect to the same k value by the number of NCS is generated as a representative result value. A third column is a center ID which is a value representing a rank of a center value among the total of k centers with respect to a certain k value and a certain NCS ID.

Each center ID may have a value ranging from 1 to k corresponding to k-set ID depending on k set-ID to which a current center belongs. In result, three values included in the data 151 stored in the apparatus storage unit 150 may be provided in the form of k-set ID|NCS ID|center ID. However, the present invention is not limited thereto, and the data 151 may be provided in any other data structure in which the above described three values are distinguished and data processing is performed based on the above three values.

Meanwhile, a user may specify a single value as a k value similar to the conventional method. Alternatively, a user may specify a range of k values by specifying a minimum k value and a maximum k value. Alternatively, a user may specify a set of k values whose results are desired. For example, a user may specify k values, k=1, 3, 4, and 8. To this end, the cluster analysis service apparatus 100 may further include an apparatus display unit to provide a screen for specifying a k value and an apparatus input unit 120 to provide an apparatus input function.

Figure 3:
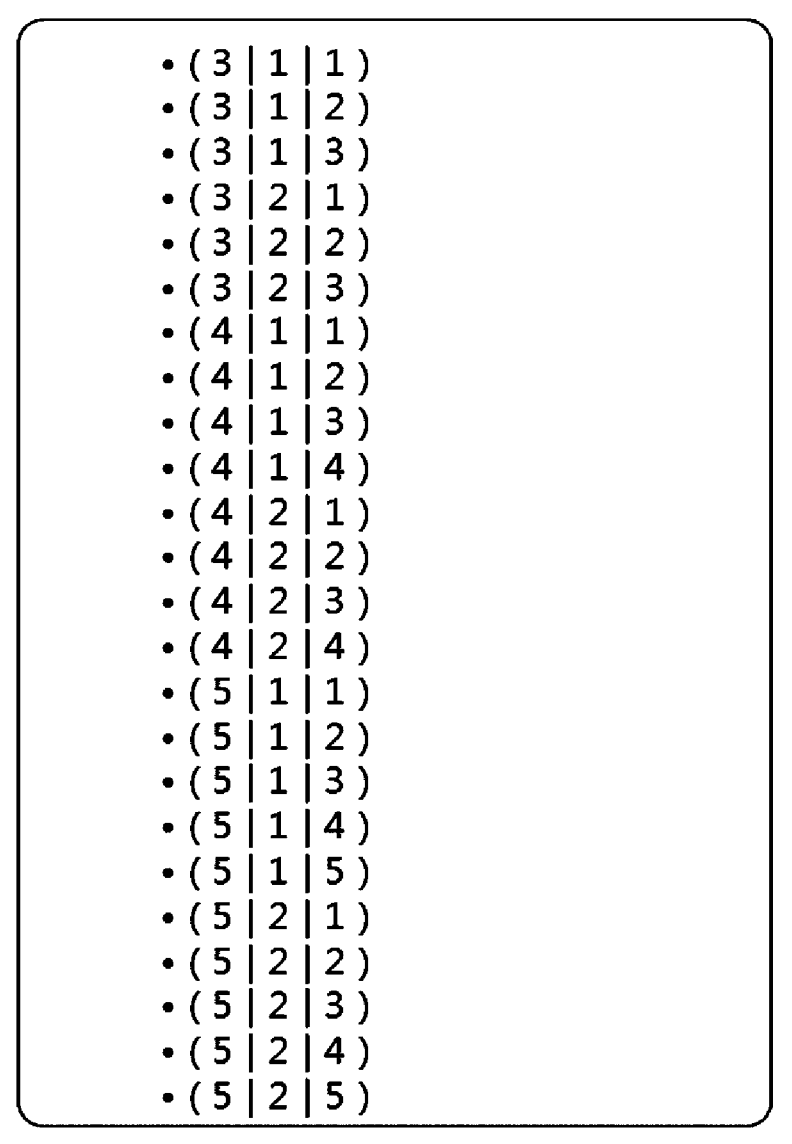

For example, when certain data that may serve as an example of the data 151 stored in the apparatus storage unit 150 has a key value of 4|2|3, the key indicates the third center (the third cluster) among center values used in generating the second result (NCS=2) for a cluster analysis with respect to k=4. When a range of k-set ID is specified as having a minimum k of 3, a maximum k of 5, and NCS=2, a key value of a center value used to distinguish each center value is shown in FIG. 3. Meanwhile, when a value of each center is required in a distributed processing environment, a d-dimensional center value may be included in a value for exchange in addition to a key for a MapReduce Framework.

The apparatus control unit 160, in order to support the cluster analysis function according to the present invention, supports delivery of the data 151, collection of the result of the cluster analysis execution, selection of k value, and index calculation of cluster analysis, and in particular, performs k value update. To this end, the apparatus control unit 160 has a configuration as shown in FIG. 4.

Figures 4, 5:
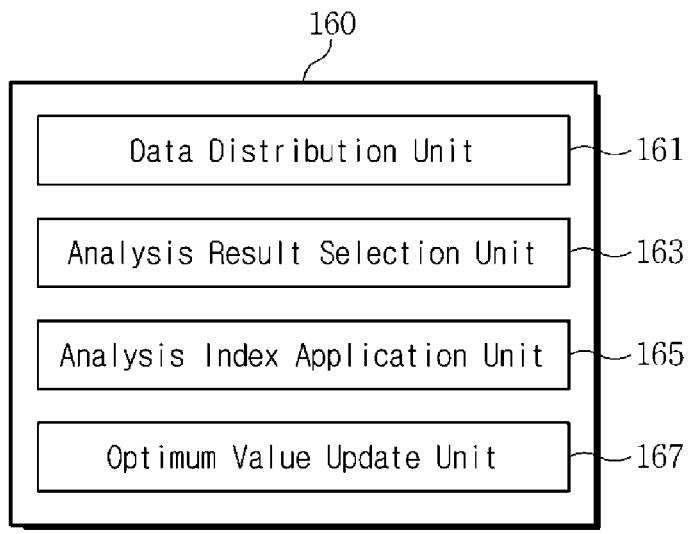
FIG. 4 is a detailed view illustrating an apparatus control unit of FIG. 2.
FIG. 5 is a view illustrating selection of an optimum center value.

FIG. 4 is a detailed view illustrating an apparatus control unit 160 of FIG. 2.

Referring to FIG. 4, the apparatus control unit 160 according to the present invention includes a data distribution unit 161, an analysis result selection unit 163, an analysis index application unit 165, and an optimum value update unit 167.

The data distribution unit 161 may perform an initialization process of calculating center value vectors based on input values input by a user through the apparatus input unit 120 so as to share k values within a predetermined range input by the user with data nodes of the distributed processing service apparatus 200. That is, the data distribution unit 161 may calculate the number of center value vectors by use of an NCS value instructing iteration of a k-means clustering with respect to the same k value as well as k values within a predetermined range. For example, when the minimum k (min_k) is 3, the maximum k (max_k) is 5, and NCS is 2, the total number of center sets is 6, and the total number of center vectors is 3*2+4*2+5*2=24. Meanwhile, the user may specify a convergence condition for application of a cluster analysis. For example, as a convergence condition, a maximum executable iteration frequency and a measure threshold may be specified. According to the present invention, cluster analyses with respect to a plurality of sets (sets of centers corresponding to a certain k-set ID and a certain NCS ID) are simultaneously performed. Accordingly, as for a set satisfying a threshold condition, a value of the set is stored, data write is performed as k-set ID|NCS ID|converged, and the set is not calculated any more. Meanwhile, the cluster analysis is performed until all sets satisfy the measure threshold that is established in the convergence condition. The data distribution unit 161, if the vector initialization process and the convergence condition setting are completed, may transmit a center set to each data node of the distributed processing service apparatus 200. In this process, the data distribution unit 161 may support to perform a distributed processing on data distributed among each data node of the distributed processing service apparatus 200.

Each data node of the distributed processing service apparatus 200 outputs a result of cluster analysis execution obtained by applying the transmitted center value set to data that is read from the cluster analysis service apparatus 100. Each data node performs a Reduce operation of the MapReduce method with the cluster analysis service apparatus 100 to transmit the output result of cluster analysis.

To each reducer, all input data about each key output from a mapper is transmitted as value. Similar to the mapper, the reducer also outputs two results with respect to each set (a certain NCS ID for a certain k-set ID). When key is represented as (k-set ID|NCSID|c_i_), each value is a vector value of an input data that is the nearest to a center value c_i_ of a set corresponding to a current key. The vector sum of all input data input as value is represented as Equation 3 below.

$$\text{sum}\_c\_i = \text{sum}\_ci\_1, \text{sum}\_ci\_2, \ldots, \text{sum}\_ci\_d \quad \text{[Equation 3]}$$

Here, sum_c_i represents the sum of all vectors.

Meanwhile, if the number of pieces of data determined to be near to c_i and thus transmitted to the current reducer among the total of n pieces of data is n_i, a new value of (k-set ID|NCS ID|c_i) is expressed as Equation 4.

$$(c\_i1', c\_i2', \ldots, ci\_d') = 1/n\_i * <\text{sum}\_ci\_1, \text{sum}\_ci\_2, \ldots, \text{and sum}\_ci\_d) \quad \text{[Equation 4]}$$

The data nodes of the distributed processing service apparatus 200 output (key, value) while having a new value obtained in Equation 4 as value. Here, Key=<k-set ID|NCS ID|center ID>, and Value=<c_1', c_2', . . . , and c_n'>.

Meanwhile, if key is (k_set ID|NCS ID|err|), each value is a partial sum of measure required to calculate all measure values of a cluster analysis corresponding to a certain k-set ID|NCS ID. All values entering the current reducer are summed. In this case, a final measure value is a value obtained by dividing the summed value by the number of all pieces of data, that is, the total of n. The data nodes may output (key, value) while having the obtained measure value as value. Here, Key=<k-set ID|NCS ID|dummy value such as 'err'>, and Value=<sum_measure_value/n>.

Meanwhile, the data nodes of the distributed processing service apparatus 200 inspect convergence conditions with respect to all center values of all k-set ID|NCS ID|. Centers satisfying the converge condition are indicated as converged. The data nodes, if all k-set ID|NCS ID| are not converged or unless the maximum iteration reaches, change a previous center set into a newly obtained value, and may repeatedly perform the above process.

The data nodes, if a result of the cluster analysis execution is derived, may transmit the result to the analysis result selection unit 163.

The analysis result selection 163 is configured to select a certain center value set from analysis results upon reception of result of cluster analysis, obtained by applying center value sets to data, from the distributed processing service apparatus 200 according to the Reduce operation. That is, the data nodes output a measure value with respect to each k-set ID|NCS ID, and transmit the measure value to the analysis result selection unit 163. The analysis result selection unit 163 stores only a center ID value corresponding to a minimum (optimum) measure value among measure values with respect to all frequencies ranging from 1 to NCS ID for each k-set ID. That is, the analysis result selection unit 163 filters only one value with respect to a single k-set ID. For example, when a cluster analysis is performed by data nodes on the total of 4000 four-dimensional data using k=3-5 and NCS=4, the analysis result selection unit 163 may collect optimum center values with respect to each k-set ID as shown in FIG. 5. In a case when k-set ID is 3 and NCS is 4, four clustering analyses are performed in a parallel manner with respect to k=3, and the analysis result selection unit 163 may select a result of the analysis execution corresponding to NCS value of 4. Similarly, when k-set ID is 4, the analysis result selection unit 163 may select a result of the analysis execution corresponding to NCS value of 3.

As shown in FIG. 5, a value next to selected is a measure value. The following row is provided in the form of 'number|coordinates', and when k=3, coordinates of the first center is (17.33, 12.00, 10.99 and 1.64), and the number of pieces of data belonging to this cluster is 3000 among the total of 4000 data. When k is 4, a third NC execution result is selected, and when a cluster analysis is achieved based on such center values, the number of pieces of data belonging to each cluster is 1000, 1000, 954, and 1046.

The analysis result selection unit 163 selects a certain result of analysis based on results collected from the data nodes, so that a cluster analysis is performed with respect to the original data by use of the selected data. To this end, the analysis result selection unit 163 may perform sharing of the selected center value information by transmitting the selected center value information to all of the data nodes.

The data node of the distributed processing service apparatus 200 may perform a Map step with the cluster analysis service apparatus 100, and in this case, perform a cluster analysis with respect to each k-set ID, for example, k=3, 4, and 5 by use of the selected center value information. Each data node calculates a distance between each center value in k-set ID and current data 251, and assigns an index of a nearest center value as a clustered index of the current data 251. In addition, the data nodes perform output by using the selected center value as value while using the current input data as key. That is, the data nodes, by inputting the center value into each k-set ID, analyze a cluster to which individual data belongs. Accordingly, a single piece of data 251 is classified into the total of k-set ID segments, and upon introduction of the total of n pieces of input data, output data as many as nX|k-setID|.

The analysis index application unit 165 may collect each data 251 assigned by the data node with a clustered index. For example, in a case when input four-dimensional data is 10, 10, 20, and 15, results including 10, 10, 20, and 15 3|4|1, 10, 10, 20, and 15 4|3|2, and 10, 10, 20, and 15 5|4|1 may be output. Here, the data 251 is classified as belonging to the second (1) cluster among three clusters when k-set ID is 3, belonging to the third (2) cluster when k-set ID is 4, and belonging to the fifth (4) cluster when k-set ID is 5.

The analysis index application unit 165, upon reception of result of the cluster analysis of each data 251, may use a clustered index to determine which k produces the most superior cluster analysis effect by use of data assigned a clustered index. In a case when all data is used before adoption of a cluster, the time required to calculate a clustered index may be great. Accordingly, the analysis index application unit 165 may be provided such that sampling is performed if necessary. Sampling may be selected in three options. That is, as the first NONE option, the analysis index application unit 165 may does not apply the sampling such that all data is used, depending on the number of pieces of data. The second sampling option operates such that the analysis index application unit 165 randomly extracts X % of data from the total of n pieces of data regardless of the cluster distribution. The third option operates such that the analysis index application unit 165 randomly extracts X % of data from the total of n_pieces of k data for each cluster in consideration of the number of pieces of data for each cluster.

For example, when it is assumed that the number of items belonging to cluster 1 is 500, the number of items belonging to cluster 2 is 200, and the number of items belonging to cluster 3 is 300, the analysis index application unit 165 may extract 100 item from cluster 1, 40 items from cluster 2, and 60 items from cluster 3 at an extraction rate of 20%. Herein, the analysis index application unit 165 may extract data in consideration of 'minimum number' and 'extraction rate' depending on the number of items of each cluster. For example, the analysis index application unit 165 may set the option to the extraction rate of 20% and the minimum number of 100. Here, if the number of pieces of data extracted at the extraction rate of 20% does not match the minimum number, the analysis index application unit 165 may randomly extract data such that the minimum number of each cluster is greater than or equal to a predetermined number as a default. The analysis index application unit 165 may provide each data node with option information to collect the above described items, and request information corresponding to the option information from each data node.

Meanwhile, the analysis index application unit 165, in order to evaluate the usefulness of the cluster analysis, may adopt various indexes. In this case, the analysis index application unit 165 may use an index having at least one of density according to the distance between each cluster and density according to the distance between each data in a certain cluster mixed thereinto. For example, the analysis index application unit 165 may adopt Dunn's Index and Davies-Bouldin's Index. A higher level in Dunn's Index indicates a superior result, and a lower level in Davies-Bouldin's Index indicates a superior result. The cluster analysis is evaluated based on the distance between each cluster (Intercluster distance) and the distance between each data in a cluster (Intracluster distance). In this case, a measure, that is, the criterion used to measure the distance may be calculated using a distance index, such as Euclidean Distance, Manhattan Distance, Chebychev distance, etc. Examples of a method of calculating the Intercluster distance include Single Linkage, Complete Linkage, Average Linkage, Centroid Linkage, Average to Centroid Linkage, Hausdorff metrics Job, etc. Examples of a method of calculating the Intracluster distance include Complete Diameter, Average Diameter, Centroid Diameter, etc. Meanwhile, the above described Dunn's Index is calculated using Equation 5.

$$D(U) = \min_{l \le j \le c} \left\{ \min_{\substack{l \le j \le c \\ j \ne i}} \left\{ \frac{\delta(X_i, X_j)}{\max_{l \le k \le c} \{\Delta(X_k)\}} \right\} \right\}$$ [Equation 5]

Here, c is the number of all clusters, and U represents all data.

The Daives-Bouldin's Index method is calculated using Equation 6.

$$DB(U) = \frac{1}{C} \sum_{i=1}^{c} \max_{i \ne j} \left\{ \frac{\Delta(X_i) + \Delta(X_j)}{\delta(X_i, X_j)} \right\}$$ [Equation 6]

Here, c is the number of all clusters, and U represents all data. The optimum value update unit 167 calculates a clustered index of each k-set ID with respect to indexes calculated by the analysis index application unit 165, and selects a k producing the optimum value. In a case when a plurality of cluster analysis indexes are adopted for evaluation, the optimum k is obtained through voting of the plurality of cluster analysis indexes. For example, if the total number of cluster analysis indexes used is three, cluster analysis index 1 and cluster analysis index 2 are optimum at k=3, cluster analysis index 3 is optimum at k=4, and any cluster analysis index is not optimum at k=5, k=3 may be selected.

FIG. 6 is a view illustrating execution of the above described cluster analysis of a certain 16-dimensional data classified into four clusters, result selection, data cluster analysis through sharing of the selected result, and calculation result of a cluster analysis index with respect to each data assigned a clustered index. The optimum value update unit 167 checks that all cluster analysis indexes are the most optimum at k=4, and determines that k=4 is the optimum value.

Meanwhile, the optimum value update unit 167 is provided to compare a k value obtained by the current cluster analysis process with a k-prev value previously obtained and a cluster analysis index value of the k-prev value, perform update using a newly obtained k value if the newly obtained k value is superior, and use the newly obtained k value in performing an actual cluster analysis.

FIG. 7 is a view illustrating an example of a configuration of a data node that may be included in the distributed processing server apparatus 200 according to the present invention.

Referring to FIG. 7, the distributed processing service apparatus 200 according to the present invention may include a node communication unit 210, a node storage unit 250, and a node control unit 260.

The data node having the above configuration forms a communication channel with the apparatus communication unit 110 of the cluster analysis service apparatus 100 through the node communication unit 210, and receives k values within a predetermined range and data 151, and stores the received k values and the data 151. The data node may perform a cluster analysis. To this end, the node storage unit 250 may include an algorithm for cluster analysis, and a MapReduce 253 which is a program for receiving data from the cluster analysis service apparatus 100. The MapReduce 253 is configured to allow a plurality of data nodes to, by distribution, receive and process big data in a process of receiving data from the cluster analysis service apparatus 100, performing a cluster analysis, and then providing the cluster analysis service apparatus 100 with a result of the cluster analysis. The MapReduce 253 may support the cluster analysis execution according to the present invention by use of the Mapper and Reducer as described above.

Meanwhile, the node storage unit 250 may temporarily or semi-permanently store data provided by the cluster analysis service apparatus 100. That is, the node storage unit 250 may store the data 251. In this case, the data 251 stored may be data significantly identical to that of the data 151 stored in the cluster analysis service apparatus 100, and may be data assigned a clustered index according to the result of the cluster analysis execution.

The node control unit 260 is configured to support such that a cluster analysis is performed according to a predefined k-means clustering method with respect to k values within a predetermined range and data that are transmitted upon a request by the cluster analysis service apparatus 100 for cluster analysis execution, and the result of the cluster analysis execution is provided to the cluster analysis service apparatus 100. The node control unit 260 may perform control of the execution of cluster analysis and assigning of a clustered index that have been described in the illustration of the cluster analysis service apparatus 100.

For example, the node control unit 260 may allow each mapper operating on each data node or a plurality of data nodes operating on the same data node to read each input of distributed one row at a time. In addition, the node control unit 260 may repeatedly perform the following process with respect to all k-set IDs and all NCS IDs. That is, the node control unit 260 obtains an index (c*) of a center that is the nearest to a current input among the total of k-set ID centers starting from the first center, and uses the obtained index (c*) as key. Value is a vector value of a current input data. A result (key, value) obtained as such is output. Here, key=(k set ID|NCS ID|c*), and value=(x_i1, x_i2, . . . , and x_id). The node control unit 260 outputs a distance value (measure) with a nearest center. Here, key=(k set ID|NCS ID|err), and value= (1|distance)=(1|sqrt((c*_2×2)^2), (c*_1×1)^2), . . . , and (c*_n×n)^2)) (in the case of Euclidean distance). Through the above process, with respect to single input data (a single row), the node control unit 260 may support such that the total of (key, value)=|k set ID|X|NCS|X2 outputs are generated with respect to a single piece of data.

The distributed processing service apparatus 200 according to the present invention performs the cluster analysis and application according to the control of the cluster analysis service apparatus 100 in an iterative manner, so that the cluster analysis result having the optimum k value is continuously obtained without additional intervention of a user even when data is changed. Here, the distributed processing service apparatus 200 may increase the execution speed by adopting a combiner of MapReduce Framework. Since the combiner performs a function, which is performed by the reducer, only in a local data node, the reducer needs to be altered to perform the same function not using an output of the mapper but using an output of the combiner. For example, an environment may be assumed in which, in order to a new center value according to a cluster analysis execution, the mapper outputs (key, value)=(center ID, data vector), and the reducer receives (key, value)=(center Id, list of data vector) as an input, and obtains a vector sum of list of data vectors to obtain an average. When if the combiner is used in this environment, the mapper outputs (key, value)=(center ID, data vector), combiner receives (key, value)=(center ID, a list of data vectors) as an input, and outputs (key, value)=(center ID, the number of lists of data vectors|a vector sum of data vectors), and the reducer receives the output of the combiner as an input to obtain an average. That is, a single reducer is designed to receive all data about a single key, and by use of the all data, calculate the total sum. However, if combiners, each of which calculates a partial sum of a single key, are adopted, reducer does not know the number of pieces of data belonging to a single center ID key while receiving an input from the combiner. Accordingly, the reducer receives the number of pieces of data, which are processed by the combiner when calculating a partial sum, from the combiner together with the partial sum to calculate a total sum. This method is achieved by altering (key, value) with respect to a single center ID key such that the number of input data processed by each combiner is additionally transmitted to the reducer, and the reducer is altered such that the average of the total sum is obtained by the reducer.

Figure 8:
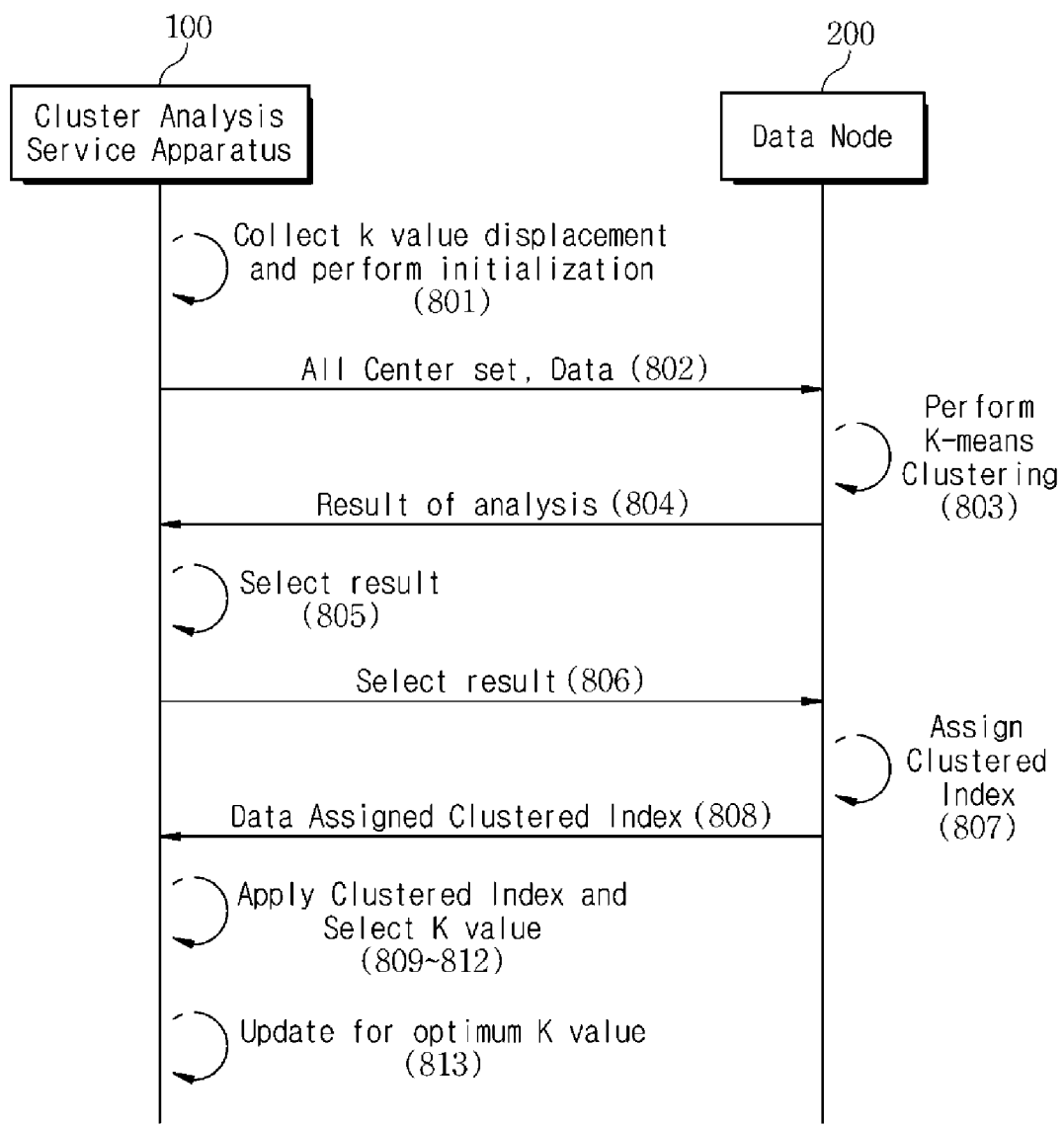
FIG. 8 is a view illustrating a cluster analysis supporting method according to an exemplary embodiment of the present invention.

FIG. 8 is a view illustrating a method of supporting clustering.

Referring to FIG. 8, according to a method of supporting a cluster analysis, the cluster analysis service apparatus 100 may collect a range of k values from a user, and perform an initialization process on center value vectors (801). At this time, the cluster analysis service apparatus 100 may collect a convergence condition of the cluster analysis. The range of k values and the convergence condition may be defined as a user inputs through the apparatus input unit 120 or instructs application of a predefined value. Thereafter, the cluster analysis service apparatus 100 may provide data nodes of the distributed processing service apparatus 200 with all center sets and data (802). In this case, the cluster analysis service apparatus 100 and the data nodes of the distributed processing service apparatus 200 may be provided such that data is processed in a distributed manner by use of respective mappers according to the MapReduce method. The data nodes having received the center sets and data may perform k-means clustering analyses based on the received center sets and data (803).

If results of the k-means clustering are output, the data nodes of the distributed processing service apparatus 200 may transmit the results to the cluster analysis service apparatus 100 by use of each reducer (804). In particular, the data nodes each may output a single output in response to a single center value. The cluster analysis service apparatus 100, upon reception of the results of analysis from the data nodes of the distributed processing service apparatus 200, may select an optimum result among the results of analysis (805). The cluster analysis service apparatus 100 provides a result of selection to the data nodes such that the result of selection is shared (806). At this time, the cluster analysis service apparatus 100 may request such that a clustered index is assigned to each data according to the result of selection.

The data nodes of the distributed processing service apparatus 200 control such that each data is assigned a clustered index based on the result of selection provided by the cluster analysis service apparatus 100 (807). The data nodes may provide the cluster analysis service apparatus 100 with the data assigned the clustered index (808). Thereafter, the cluster analysis service apparatus 100 may perform a clustered index application and performs a k value selection (809 to 812).

That is, the cluster analysis service apparatus 100, if the amount of data to be subject to the clustered index exceeds a predetermined value, may support a sampling application according to at least one of predefined sampling methods in the operation 809. Thereafter, the cluster analysis service apparatus 100 performs a calculation of a clustered index of each k value in the operation 810, and selects a k value having the highest clustered index in the operation 811. The cluster analysis service apparatus 100 may support such that two clustered indexes are compared and a k value having a higher clustered index is selected in the operation 812. That is, the cluster analysis service apparatus may apply a plurality of indexing methods to calculation of a clustered index of each k value, and select a higher k value from the index methods. Although the above description has been made in relation that the cluster analysis service apparatus 100 directly perform the sampling, the present invention is not limited thereto. That is, the cluster analysis service apparatus 100 may provide each data node of the distributed processing service apparatus 200 with the sampling condition, receive data conforming the sampling condition, and based on the received data, perform the operations 810 to 812. Thereafter, the cluster analysis service apparatus 100 may compare a previously stored value (k_prev) with a current k value to perform update of k value such that a more appropriate k value is stored (813).

The present invention resolves difficulty in obtaining a superior clustering result unless a user manually specifies an appropriate k value during the k-means clustering, and supports such that the cluster analysis is automatically performed in terms of a system and based on the analysis result, a cluster analysis index is calculated, thereby obtaining the most appropriate k value.

In addition, the present invention may be applicable without restriction even if data having a big size needs to be processed based on a distributed processing framework. In addition, the present invention automatically finds the most appropriate k value if a user specifies a predetermined range without specifying a certain k value in advance, and such a finding process is periodically executed without user's intervention, and thus the value is adjusted by itself according to change of data.

Meanwhile, although the above description has been made in relation that the cluster analysis service apparatus 100 and the distributed processing service apparatus 200 are divided from each other to support the cluster analysis service, and perform MapReduce functions in cooperation with each other, the present invention is not limited thereto. That is, the distributed processing service apparatus 200 may be substituted with the configuration of the apparatus storage unit 150 of the cluster analysis service apparatus 100. In this case, the apparatus storage unit 150 may have parts that are logically divided to provide the data distributed processing function of the distributed processing service apparatus 200, or physically divided by a designer's intention, and such divided parts may serve as the data nodes described above. Here, the apparatus control unit 160 of the cluster analysis service apparatus 100, if the apparatus storage unit 150 is designed to serve as the distributed processing service apparatus 200, may allow each part of the apparatus storage unit 150 to be provided in the form available for multitask processing such that concurrent access and data processing are performed.

Meanwhile, the function to provide the cluster analysis may be implemented in the form of a program executable through various computing devices, and recorded in a computer readable recording medium. The computer readable recording medium may be implemented in a program instruction, a data file, and a data structure, or in the combination of one or more of these. Meanwhile, the program recorded in the recoding medium may be designed and constructed for the present invention or easily constructed by programmer.

Examples of the computer readable recording medium include hardware device constructed to store and execute a program instruction, for example, a magnetic media such as hard disks, floppy disks, and magnetic tapes, optical media such as CD-ROMs, and DVDs, magneto-optical media such as floptical disk, read-only memories (ROM), random access memories (RAM), and flash memories. In addition, the program instruction may include a machine code made by a compiler, and a high-level language executable by a computer through an interpreter. The above described hardware device may operate as one or more software modules to perform the operation of the present invention.

Although the cluster analysis function according to a few embodiments of the present invention has been described with reference to the specification and drawings through specific terms, the use of such a term is nothing but the ones provided to bring the present invention to perfection and assist those skilled in the art to completely understand the present invention and thus the scope of the present invention is not limited to such embodiments and terms. Accordingly, it will be apparent to those skilled in the art that various exemplary embodiments may be made without departing from the scope of the invention.

INDUSTRIAL APPLICABILITY

The present invention provides a cluster analysis supporting system and method and an apparatus supporting the same, capable of automatically calculating the optimum k value without a user's control, and supporting a cluster analysis according to the optimum k value, so that the reliability and stability on cluster analysis of data are improved.

The invention claimed is:

1. A system for supporting a cluster analysis, the system comprising:
a cluster analysis service apparatus configured to select an optimum center values corresponding to each of k values within a predetermined range through a simultaneous cluster analysis of a k-means which corresponds to a preset iteration frequency for each of the k values within the predetermined range provided for the cluster analysis and determine an optimum k value among the k values within the predetermined range through an index calculation with respect to applying clustered indexes assigned based on the selected optimum center values to data; and
at least one distributed processing service apparatus configured to provide the clustering analysis service apparatus with the optimum center values selected by simultaneously performing the cluster analysis of a k-means which corresponds to a preset iteration frequency for each of the k values within the predetermined range upon a request by the cluster analysis service apparatus, wherein the distributed processing service apparatus comprises at least one data node configured to provide the clustered indexes on the data to the cluster analysis service apparatus.

2. A cluster analysis service apparatus for supporting a cluster analysis, the cluster analysis service apparatus comprising:

an apparatus storage unit configured to store data;
an apparatus input unit configured to generate an input signal related to k values within a predetermined range, a convergence condition, and an iteration frequency, which are provided for a cluster analysis of the stored data; and
an apparatus control unit configured to select an optimum center values corresponding to each of the k values by simultaneously performing a cluster analysis of a k-means which corresponds to a preset iteration frequency for each of the k values, and determine an optimum k value among the k values within the predetermined range through an index calculation with respect to applying clustered indexes assigned based on the selected optimum center values to data.

3. The cluster analysis service apparatus of claim 2, wherein the apparatus storage unit stores a previously calculated previous k value.

4. The cluster analysis service apparatus of claim 3, wherein the apparatus control unit comprises:
a data distribution unit configured to distribute data such that a cluster analysis of a k-means which corresponds to a preset iteration frequency for each of the k values is simultaneously performed;
an analysis result selection unit configured to select optimum center values;
an analysis index application unit configured to perform an index calculation with respect to k value efficiency of data assigned clustered indexes obtained by applying a result of selection having the optimum center values to the data; and
an optimum value update unit configured to update a previously stored k value based on a k value having an optimum result of the index calculation.

5. The cluster analysis service apparatus of claim 2, wherein the apparatus control unit is configured to support the cluster analysis to automatically perform result calculation of center values with respect to a plurality of k values simultaneously by a plurality of number of times while having a different initialization value each time of the calculation.

6. A method of supporting a cluster analysis, the method comprising:
by a cluster analysis service apparatus, transmitting data in a distributed manner to data nodes based on a preset iteration frequency for each of k values within a predetermined range, which are input to perform a cluster analysis;
by the data nodes, performing a cluster analysis of a k-means which corresponds to each of the k values;
by the data nodes, selecting optimum center values corresponding to each of the k values based on the results of the cluster analysis, and providing the selected optimum center values to the cluster analysis service apparatus;
by the cluster analysis service apparatus, sharing the selected optimum center values with the data nodes;
by the data nodes, assigning clustered indexes obtained by applying the selected optimum center values to data;
by the cluster analysis service apparatus, performing an index calculation on the data to which the clustered indexes are assigned; and
by the cluster analysis service apparatus, determining an optimum k value among the k values within the predetermined range based on the results of the index calculation.

7. The method of claim 6, wherein in the step of performing an index calculation, the cluster analysis service apparatus calculates data based on which the index calculation is performed according to a sampling condition, and performs the index calculation based on the calculated data.

8. The method of claim 6, further comprising by the cluster analysis service apparatus, performing sampling on the data assigned the clustered indexes that are provided by the data nodes.

9. The method of claim 6, wherein the performing of the index calculation comprises:
  performing calculation of a clustered index for each k value; and
  selecting a k value having a highest clustered index.

10. The method of claim 9, wherein the performing of the index calculation further comprises applying a plurality of indexing methods to the calculation of the clustered index for each k value to select a relatively higher k value from the plurality of indexing methods.

11. The method of claim 6, wherein in the step of performing the k-means clustering, a result of the k-means clustering is automatically calculated with respect to a plurality of k values simultaneously by a plurality of number of times while having a different initialization value each time of the calculation.

12. A computer readable recording medium recording a program executing the method recited in claim 6.

* * * * *